Nov. 17, 1953 R. POST 2,659,156

STEADY-REST CENTERING GAUGE

Filed March 4, 1950

Inventor
Robert Post

By

ATTORNEYS

Patented Nov. 17, 1953

2,659,156

UNITED STATES PATENT OFFICE 2,659,156

STEADY-REST CENTERING GAUGE

Robert Post, San Andreas, Calif.

Application March 4, 1950, Serial No. 147,697

2 Claims. (Cl. 33—169)

This invention is directed generally to a gauge adapted for use in connection with a machine lathe.

An important object of the invention is to provide a novel gauge useful to aid in setting the lower work supporting jaws of a steady-rest to correct position.

Another object of the invention is to provide a steady-rest centering gauge which is adapted to detachably mount on the lathe tailstock; the device including a taper shank for engagement in the tailstock bore after removal of the usual centering pin.

A further object of the invention is to provide a steady-rest centering gauge which is convenient to use, and capable of ready mounting in connection with or detachment from the tailstock of a lathe.

An additional object of the invention is to provide a steady-rest centering gauge which comprises, essentially, a longitudinally adjustable gauge finger and a mounting therefor which supports the gauge finger exactly radially of the center line of the lathe in the transverse plane of the jaws of the steady-rest; said jaws then being set to position by the gauge finger, after the latter is adjusted to project from said center line the same distance as the radius of the work.

Still another object of the invention is to provide a steady-rest centering gauge which is designed for ease and economy of manufacture.

Another object of the invention is to provide a practical and reliable steady-rest centering gauge, and one which will be exceedingly effective for the purpose for which it is designed.

These objects are accomplished by means of such structure and relative arrangement of parts as will fully appear by a perusal of the following specification and claims.

Figure 1:
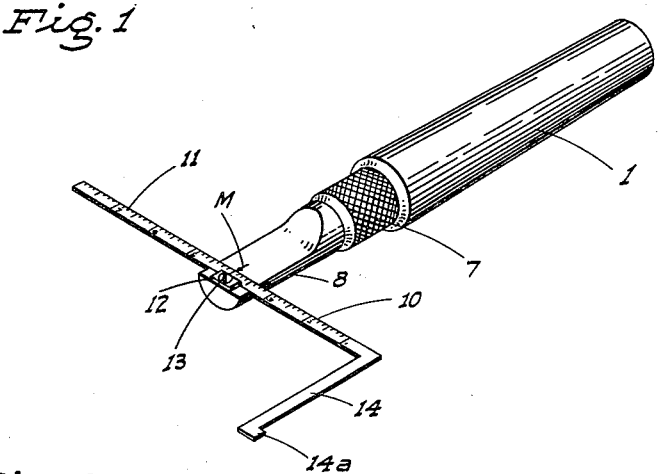
Fig. 1 is a perspective view of the device, detached.
Figure 2:
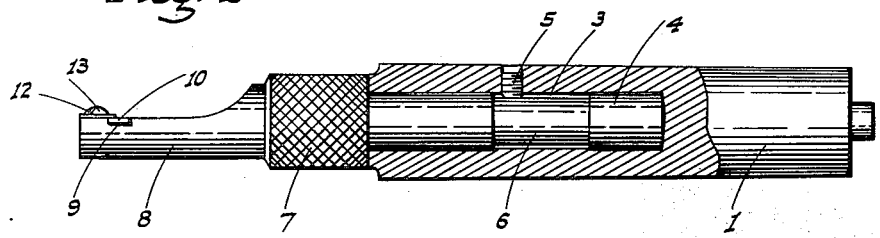
Fig. 2 is an enlarged side elevation of the device, partly in section.

Referring now more particularly to the characters of reference on the drawings, the novel, steady-rest centering gauge comprises a taper shank 1 whose taper is such that it is adapted to engage in the bore of a lathe tailstock 2 after removal of the usual centering pin.

The taper shank 1 is formed with a straight axial bore 3 which opens to the front end of said shank, and a spindle 4 is turnably mounted in, and projects from said bore to a termination ahead of the front end of the shank 1.

The spindle 4 is maintained in the bore 3 in rotatable relation, and for limited axial sliding motion, by means of a stop screw 5 threaded radially through the shank 1 and projecting at the inner end into a reduced diameter or grooved portion 6 of the spindle 4 within the bore 3.

Immediately exteriorly of the front end of the taper shank 1 the spindle 4 is formed with an enlarged, knurled finger grip 7.

Ahead of the finger grip 7, the front end portion 8 of the spindle is cut away or formed to half-round in cross section. The flat of such half-round portion is formed, closely adjacent the front end of the spindle 4, with a transverse groove 9, and a radial finger gauge 10 seats flush in said groove for sliding adjustment. The radial finger gauge 10 is scaled, as at 11, and is normally held in fixed position by a locking plate 12 secured to the flat of the front end portion of the spindle by a screw 13; said locking plate bearing on top of the gauge finger 10.

At one end the gauge finger 10 is formed with a forwardly extending projection 14, which at its forward end has a lateral feeler tip 14a.

As the flat of the forward portion 8 of the spindle 10 intersects the longitudinal center line of the device, the gauge finger 10, on its scaled side, is exactly radial of said line, as is requisite to the accomplishment of accurate adjustment of the steady-rest jaws. The scaling 11 on the finger reads from the outer edge of tip 14a; the flat face of the spindle portion 8 having a central indicating mark M, which mark is thus on the axis of rotation of the device.

Figure 3:
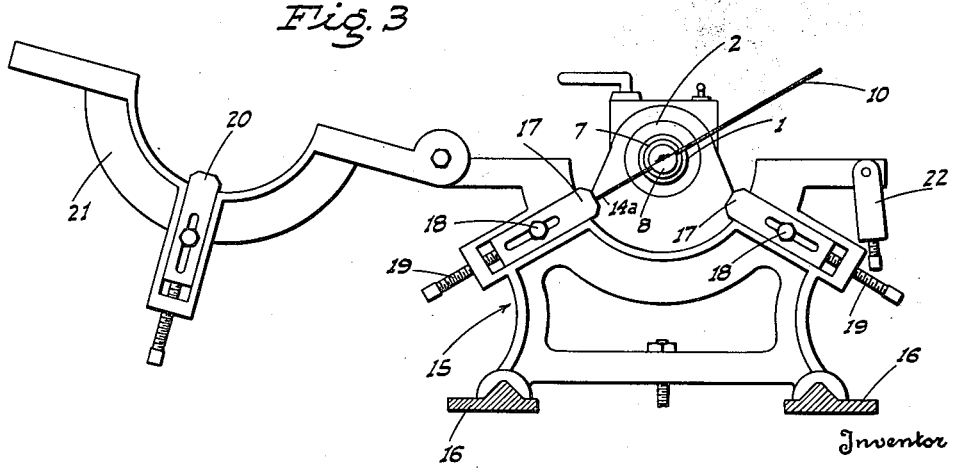
Fig. 3 is an end elevation of a lathe steady-rest in open position, the view looking toward the tailstock, and showing the device as in use.

The above described device is used in the following manner:

The numeral 15 indicates generally the steady-rest supported on the ways 16 of a lathe between the headstock (not shown) and the tailstock 2. The steady-rest 15 includes a pair of transversely spaced lower jaws 17 normally but releasably secured in place by lock screws 18; said jaws being adjustable by screws 19 when the screws 18 are released. Additionally, the steady-rest includes a similarly adjustable top jaw 20 carried in a top yoke 21 which is swingable from a closed position to an open position; the latter position being shown in Fig. 3. A latch 22 is released to permit the top yoke 21 to be opened.

With the top yoke 21 in its open position, the taper shank 1 is engaged in the centering pin bore of the tailstock 2; the radial gauge finger 10 having previously been set by the scale 11 to project from the longitudinal center line a distance exactly equal to the known radius of the work to be supported in the steady-rest 15.

Thereafter, the spindle 4 is rotated by the finger grip 7 until the tip 14a of the radial gauge finger 10 projects directly toward one of the lower jaws 17; the latter then being adjusted until it abuts said tip. The same procedure is repeated for the other lower jaw 17, whereby both are then set a predetermined and exactly equal distance from the longitudinal center line of the lathe.

After the lower jaws 17 are set, the work is placed in the lathe, the top yoke 21 is closed and latched, and the top jaw 20 is then adjusted to position.

The spindle 4 is mounted, in the taper shank 4, for limited longitudinal sliding motion in order to facilitate use of the device. In other words, the tailstock 2 can be run up generally the correct distance from the steady-rest 15, and then the spindle 4 may be adjusted lengthwise to the extent necessary to radially aline the gauge finger 10 with the lower jaw 17 which is to be adjusted.

The described steady rest centering gauge is designed for ease and economy of manufacture, as well as practical and convenient use.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A centering gauge for the jaws of a lathe steady-rest comprising a spindle, a tailstock engaging shank in which the spindle is turnably mounted and from which the spindle projects in a forward direction, the spindle ahead of the shank having a flat face disposed diametrally of the axis of the spindle and shank, and said flat face having a transverse groove, and a radially extending gauge finger slidable in the groove with one face flush and radial with said flat face and at one end having a tip to engage a steady-rest jaw; said face of the gauge finger being calibrated in terms of its radial length from said tip as a zero point to the axis of the spindle whereby to measure the radial distance of the jaw from the axial line of the spindle.

2. A centering gauge for the jaws of a lathe steady-rest comprising a taper shank to fit in the lathe tailstock, a spindle separate and projecting from the forward end of the shank, a jaw-engaging element mounted on the outer end of the spindle, and means mounting the spindle in the shank for free rotation and free but limited movement in an axial direction whereby to allow of quick advance and retraction of the element to and from a gauging position without movement of the shank and tailstock.

ROBERT POST.

References Cited in the file of this patent
UNITED STATES PATENTS

| Number | Name | Date |
|---|---|---|
| 603,782 | Brown | May 10, 1898 |
| 1,265,423 | Burnett | May 7, 1918 |
| 1,297,729 | Picard | Mar. 18, 1919 |
| 1,444,080 | Nyman | Feb. 6, 1923 |
| 2,246,088 | Clementz | June 17, 1941 |
| 2,346,192 | Schwartz | Apr. 11, 1944 |
| 2,493,332 | Aubin | Jan. 3, 1950 |

FOREIGN PATENTS

| Number | Country | Date |
|---|---|---|
| 443,642 | Germany | May 3, 1927 |
| 576,436 | Great Britain | Apr. 3, 1946 |